US005415503A

United States Patent [19]

Strange et al.

[11] Patent Number: 5,415,503

[45] Date of Patent: May 16, 1995

[54] PORTABLE DRILLING MACHINE WITH INTERNAL MOTOR CONTROL CORD

[75] Inventors: Robert E. Strange, Marco Island, Fla.; William C. McKay, Davenport; Michael D. Fangmann, Blue Grass, both of Iowa

[73] Assignee: Jancy Engineering Company, Davenport, Iowa

[21] Appl. No.: 236,261

[22] Filed: May 2, 1994

[51] Int. Cl.[6] .................... B23B 45/02; B23B 45/14

[52] U.S. Cl. .................... 408/76; 408/136; 408/135; 408/710

[58] Field of Search .................... 408/76, 111, 124, 135, 408/136, 710

[56] References Cited

U.S. PATENT DOCUMENTS 3,837,757 9/1974 Levine .................... 408/136

5,342,153 8/1994 Dobkins .................... 408/76

OTHER PUBLICATIONS

J-100 Slugger, Portable Drilling Machine–Jancy Eng. Co. Davenport, Iowa.

Portable Drills, Hougen Manufacturing, Inc.

Magnetic Drill Stand, O. S. Walker Co., Inc. Worcester, Mass.

*Primary Examiner*—Daniel W. Howell

*Attorney, Agent, or Firm*—Robert G. Mentag

[57] ABSTRACT

A portable electromagnetic drilling machine which is provided with an enclosed motor power control cord that connects the machine electrical control panel to a machine electric drive motor for a cutting tool spindle. The provision of an enclosed electric motor power control cord eliminates any wrongful or inadvertent lifting of the machine by said cord, and insures the lifting and carrying of the machine will be carried out by a handle on the machine housing.

1 Claim, 2 Drawing Sheets

PORTABLE DRILLING MACHINE WITH INTERNAL MOTOR CONTROL CORD

BACKGROUND OF THE INVENTION

1. Field of the Invention

The field of art to which this invention pertains may be generally-located in the class of devices relating to portable electromagnetic drilling machines. Class 408, Cutting by Use of Rotating Axially Moving Tool, United States Patent Office Classification, appears to be the applicable general area of art to which the subject matter similar to this invention has been classified in the past.

2. Description of the Prior Art

This invention relates to portable electromagnetic drilling machines. Heretofore all portable electromagnetic drilling machines were provided with a looped electric motor control power cord which extended from the electrical panel for the machine, and externally therefrom, to an electric motor that rotates a conventional cutting tool spindle. All portable electromagnetic machines of this type are provided with a particular handle for carrying the machine. However, in many instances the user of such a machine will wrongly or inadvertently grab the looped electrical motor control power cord and use it as a handle to carry the machine. The wrongful or inadvertent use of the electrical motor control power cord for the cutter spindle motor has resulted in a large number of repairs to such machines, because of failure of the machine to operate due to the electrical motor control power cord being pulled loose by lifting the machine with this cord.

SUMMARY OF THE INVENTION

It is an object of the present invention to provide a portable electromagnetic drilling machine which overcomes the problems encountered in the use of such machines when they are provided with external motor control cords. The present invention provides an electromagnetic portable drilling machine which incorporates a hidden or internal mounted motor control cord, so that the user of the machine cannot wrongly or inadvertently pick up the machine by using the motor control cord as a handle. The mounting of the cutter spindle motor control cord within the machine structure vastly minimizes machine failures which occur in the use of the prior art portable electromagnetic drilling machines provided with external motor control cords that are wrongly used as a handle for lifting and carrying the machine. The portable electromagnetic drilling machine of the present invention with its internal motor control cord provides a machine which is not subject to the many electrical failures, and reduced use time, which the prior art machines are subject to because of the wrongful use of the motor control cord for a handle for lifting and carrying the machines.

DESCRIPTION OF THE PREFERRED EMBODIMENT

Figure 1:
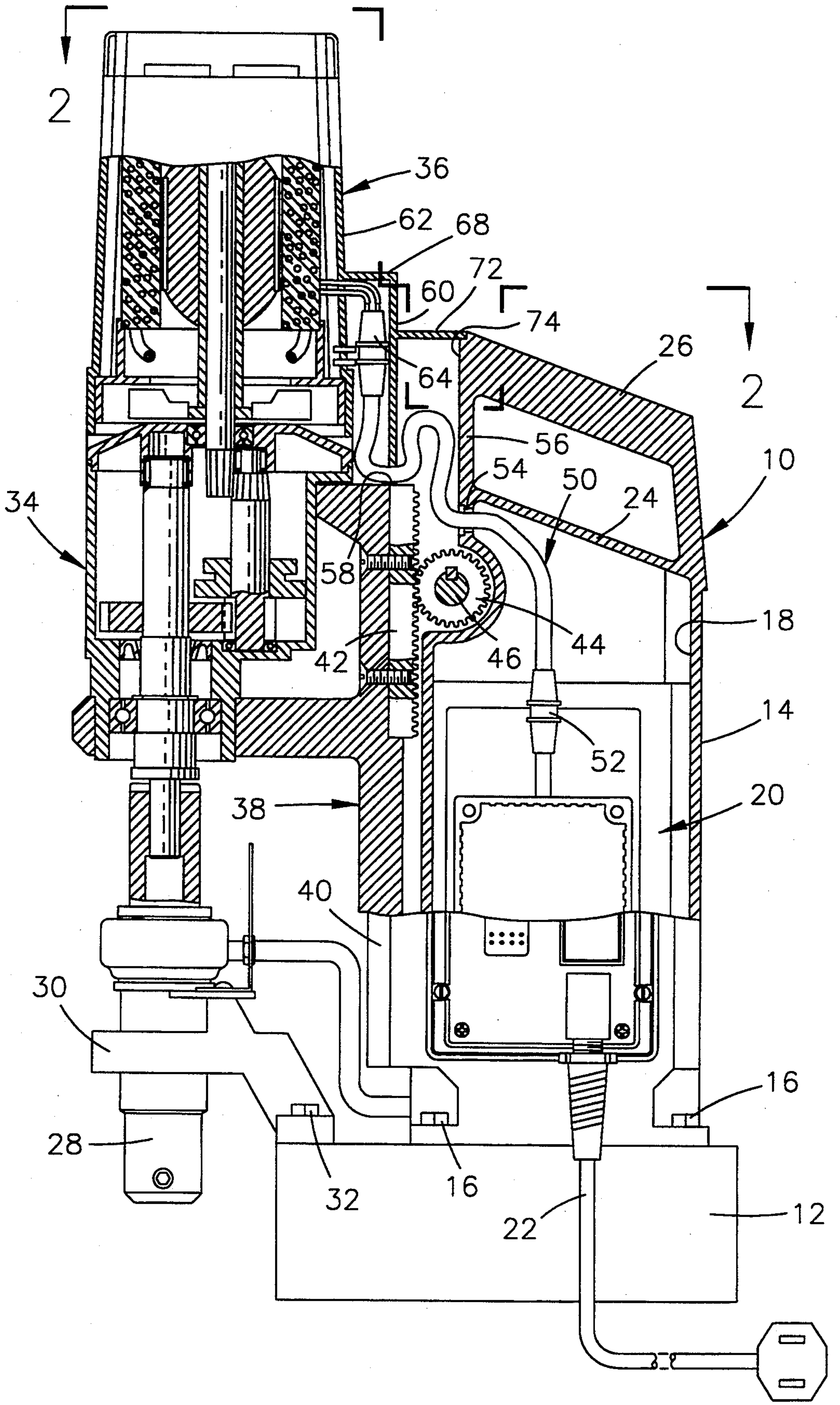
FIG. 1 is a side elevation view, with parts removed and parts in section, of a portable electromagnetic drilling machine with an internal motor control cord, and made in accordance with the principles of the present invention.
Figure 2:
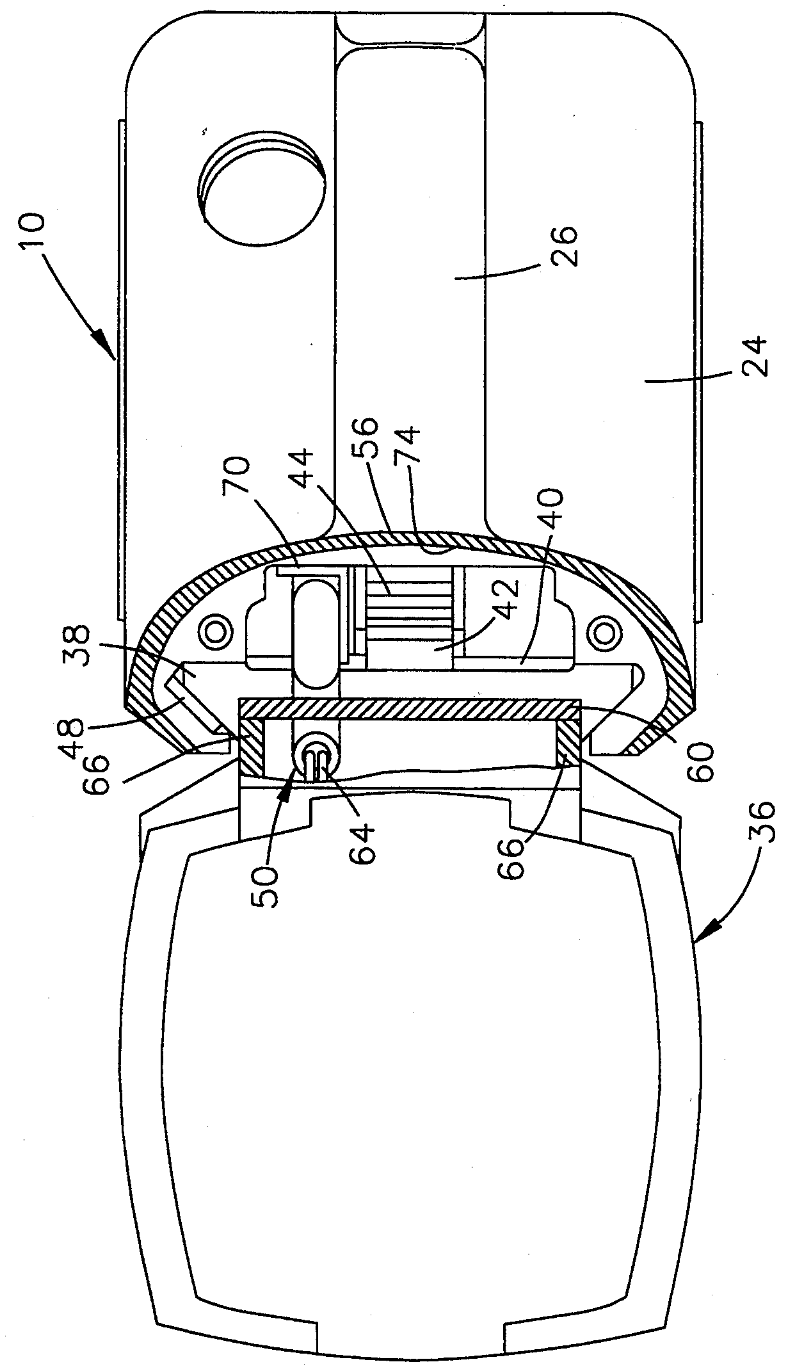
FIG. 2 is an enlarged, horizontal view, with parts removed and parts in section, of the portable electromagnetic drilling machine with an internal motor control cord, as shown in FIG. 1.

Referring now to the drawings, and in particular to FIG. 1, the numeral 10 generally designates a portable electromagnetic drilling machine with an internal motor control cord, and made in accordance with the principles of the present invention. The numeral 12 designates a conventional electromagnet base. The numeral 14 designates a housing or frame which is mounted on the top side of the electromagnet base 12 by suitable machine screws 16. The housing 14 is provided with an internal chamber 18, in the lower end of which is operatively mounted a conventional electrical control panel, generally indicated by the numeral 20. The control panel 20 is adapted to be operatively connected to a power source by a power supply cord 22. As shown in FIGS. 1 and 2, the housing 14 is provided with a top enclosure wall 24 on which is integrally formed a handle 26 for lifting and carrying the machine 10.

The portable electromagnetic drilling machine 10 includes a conventional cutting tool spindle 28 which is operatively mounted for vertical up and down movement in a support bracket 30 that is attached to the electromagnet base 12 by suitable machine screws 32. The cutting tool spindle 28 is operatively connected to a conventional drive gear transmission, generally indicated by the numeral 34, which in turn is operatively connected to the drive shaft of a drive motor, generally indicated by the numeral 36. The cutting tool spindle 28, drive gear transmission 34 and drive motor 36 are all conventional items employed in a portable electromagnetic drilling machine, such as the machine 10. As shown in FIG. 1, the drive gear transmission 34 and drive motor 36 are operatively connected in a conventional manner to a vertically movable slide, generally indicated by the numeral 38. The slide 38 is slidably mounted for vertical movement on a conventional slide way indicated by the numeral 40 in FIGS. 1 and 2. The slide 38 has fixedly mounted thereon a conventional gear rack 42 which is driven up and down by a conventional pinion gear 44 that is operatively mounted on a conventional drive shaft 46. The drive shaft 46 is provided with a conventional handle (not shown) for rotating the shaft 46, to turn the pinion gear 44 and move the gear rack 42 and slide 38, upwardly and downwardly on the slide way 40.

The numeral 48 in FIG. 2 designates a slide adjustment plate for adjusting the slide 38 on the slide way 40. The numeral 50 in FIGS. 1 and 2, generally designates the electric motor power control cord which is operatively connected at its lower end through a suitable power cable connector means 52 to the electrical control panel 20. As shown in FIG. 1, the motor power control cord 50 extends upwardly from the electrical control panel 20 and through the internal chamber 18 in the space above the electrical control panel 20 and sidewardly, outward through an opening 54 in an upper extension wall 56 that is integrally formed on the upper inner side of the housing 14.

As shown in FIG. 1, an intermediate portion of the electric motor power control cord 50 extends upwardly along the outer face of the housing wall 56 and then curves downwardly and seats against the upper end of the gear rack 42 and passes through a curved recess 58 in the upper end of the slide 38. The upper end of the electric motor power control cord 50 extends around the lower end of an enclosure wall 60 and upwardly inside the wall 60. The enclosure wall 60 is spaced apart from the cover wall 62 of the motor 36. As shown in FIG. 1, the upper end of the electric motor power cord 50 is provided with a suitable and conventional electrical fitting 64 for an operative connection to the lead wires from the motor 36. The electrical fitting 64 is releasably secured to the motor wall 62 by a suitable means (not marked).

As shown in FIG. 2, the enclosure plate 60 is operatively enclosed along the vertical side edges by a pair of vertical enclosure plates 66. As shown in FIG. 1, the upper ends of the enclosure plates 60 and 66 are enclosed by a top enclosure plate 68. The enclosure plates 60, 66 and 68 are secured together, and to the motor wall 62 by any suitable means, as by welding. As shown in FIG. 2, the motor power control cord 50 is provided with a shield plate 70 between said cord and the inner housing wall 56. As shown in FIG. 1, the space between the outer face of the housing wall 56 and the vertical enclosure plate 60 is enclosed by a suitable plate 72 which is C-shaped in plan view, to cover the top end of the C-shaped housing wall 56 (FIG. 2). The plate 72 is fastened to the wall 56, but it has its outer end slidably mounted around the enclosure walls 60 and 66.

It will seen from the aforegoing, that the electric motor power cord 50 is enclosed in the combination of closed space areas which include the upper end of the housing chamber 18, the enclosed space 74 between the housing upper C-shaped wall 56 and the space between the motor wall 62 and the enclosure plates 60 and 66. Accordingly, the electric motor power cord 50 is in a protected enclosure at all times, whereby operators of the machine cannot at any time get a hold of said motor power cord 50 and put a strain on the same so as to break the electric connection between the electrical control panel 20 and the electric motor 36, and yet which positioning of the cord 50 permits the motor 36 and associated drilling elements to be moved upwardly and downwardly on the slide way 40.

What is claimed is:

1. A portable electromagnetic drilling machine (10) having an electromagnetic base (12), a housing (14) with an inner wall (56) mounted on said base, a cutting tool spindle (28) mounted on said base (12), and an electric spindle drive motor (36) slidably mounted on said housing (14) for upward and downward movement with the cutting tool spindle (28), wherein:

(a) said machine (10) has an electrical control panel (20) mounted in said housing (14);

(b) said housing (14) has a chamber (18) formed therein above said electrical control panel (20);

(c) said machine (10) has an electric motor power control cord (50) having a lower end positioned in said chamber (18) above said electrical control panel (20) and being operatively connected to said electrical control panel (20);

(d) said electric motor power control cord (50) having an intermediate portion extended through an opening (54) in the inner wall (56) of said housing (14) and into a space (74) between said housing inner wall (56) and said electric drive motor (36);

(e) said electric motor power control cord (50) having an upper end fixedly supported on the electric drive motor (36) in an enclosure means (60,66,68) mounted on said drive motor (36), and said cord (50) being operatively connected to the drive motor (36); and, (f) cover means (72) for enclosing the space (74) between said cord enclosure means (60,66,68) on the electric drive motor (36) and the housing inner wall (56).

* * * * *